United States Patent
Buchner et al.

(10) Patent No.: US 10,784,522 B2
(45) Date of Patent: Sep. 22, 2020

(54) FUEL CELL HAVING A FLOW DISTRIBUTOR

(71) Applicant: Bayerische Motoren Werke Aktiengesellschaft, Munich (DE)

(72) Inventors: Andreas Buchner, Steinebach (DE); Michael Bauer, Unterfoehring (DE); Stefan Haase, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 566 days.

(21) Appl. No.: 14/721,160

(22) Filed: May 26, 2015

(65) Prior Publication Data

US 2015/0255804 A1    Sep. 10, 2015

Related U.S. Application Data

(63) Continuation of application No. PCT/EP2013/071303, filed on Oct. 11, 2013.

(30) Foreign Application Priority Data

Nov. 27, 2012    (DE) .................... 10 2012 221 676

(51) Int. Cl.
*H01M 8/02*    (2016.01)
*H01M 8/24*    (2016.01)
(Continued)

(52) U.S. Cl.
CPC ......... *H01M 8/026* (2013.01); *H01M 8/0265* (2013.01); *H01M 8/04089* (2013.01);
(Continued)

(58) Field of Classification Search
CPC ............... H01M 8/026; H01M 8/1018; H01M 8/04753; H01M 8/04089; H01M 8/241;
(Continued)

(56) References Cited

U.S. PATENT DOCUMENTS

| | | | | |
|---|---|---|---|---|
| 2002/0064702 A1* | 5/2002 | Gibb | ................... | H01M 8/0213 429/492 |
| 2003/0224239 A1* | 12/2003 | Carlstrom | ........... | H01M 8/0226 429/434 |

(Continued)

FOREIGN PATENT DOCUMENTS

| | | |
|---|---|---|
| CN | 1745491 A | 3/2006 |
| CN | 1767240 A | 5/2006 |

(Continued)

OTHER PUBLICATIONS

Pipe Flow and Calculations ({http://www.pipeflowcalculations.com/pipe-valve-fitting-flow/flow-in-valves-fittings.php}).*

(Continued)

*Primary Examiner* — Jonathan G Leong
*Assistant Examiner* — Aaron J Greso
(74) *Attorney, Agent, or Firm* — Crowell & Moring LLP

(57) ABSTRACT

A fuel cell having an anode-cathode stack includes at least one active surface layer formed by a first channel structure with a first and at least one second channel for conducting a first fluid over the at least one active surface layer of the anode-cathode stack. A first distributor structure for distributing the first fluid into the first and the at least one second channel of the channel structure is provided. The first distributor structure is configured with a first surface region assigned to the first channel and with a second surface region assigned to the second channel. The two surface regions are configured with a flow resistance of differing magnitude for the first fluid distributed in the first distributor structure.

13 Claims, 5 Drawing Sheets

(51) Int. Cl.
*H01M 8/04* (2016.01)
*H01M 8/10* (2016.01)
*H01M 8/026* (2016.01)
*H01M 8/0265* (2016.01)
*H01M 8/04089* (2016.01)
*H01M 8/04746* (2016.01)
*H01M 8/1018* (2016.01)

(52) U.S. Cl.
CPC ..... *H01M 8/04753* (2013.01); *H01M 8/1018* (2013.01); *H01M 2008/1095* (2013.01); *H01M 2300/0082* (2013.01)

(58) Field of Classification Search
CPC ....... H01M 8/0265; H01M 2300/0082; H01M 2008/1095; Y02E 60/50
See application file for complete search history.

(56) References Cited

U.S. PATENT DOCUMENTS

| | | | |
|---|---|---|---|
| 2004/0151970 A1 | 8/2004 | Ferguson | |
| 2004/0191606 A1* | 9/2004 | Lee ..................... | H01M 8/0258 429/444 |
| 2005/0142421 A1* | 6/2005 | Lisgaras ........... | H01M 8/04014 429/456 |
| 2006/0068252 A1 | 3/2006 | An et al. | |
| 2009/0011310 A1* | 1/2009 | Trabold .............. | H01M 8/0245 429/457 |
| 2009/0162733 A1 | 6/2009 | Iverson et al. | |
| 2009/0325036 A1 | 12/2009 | Blank et al. | |
| 2010/0104922 A1 | 4/2010 | Mattejat et al. | |
| 2011/0207018 A1 | 8/2011 | Nakagawa et al. | |
| 2014/0017600 A1 | 1/2014 | Brandt et al. | |

FOREIGN PATENT DOCUMENTS

| | | |
|---|---|---|
| DE | 10 2005 057 045 A1 | 6/2007 |
| DE | 10 2006 005 339 A1 | 8/2007 |
| DE | 10 2008 017 600 A1 | 10/2009 |
| EP | 1 557 894 A1 | 7/2005 |
| EP | 1 970 985 A1 | 9/2008 |
| EP | 2 132 815 B1 | 5/2011 |
| EP | 2 503 630 A1 | 9/2012 |

OTHER PUBLICATIONS

Chinese Office Action issued in counterpart Chinese Application No. 201380058933.X dated Jul. 8, 2016, with English translation (twelve (12) pages).

International Search Report (PCT/ISA/210) dated Dec. 10, 2013, with English translation (six (6) pages).

German Search Report dated Dec. 5, 2012, with partial English translation (ten (10) pages).

Chinese-language Office Action issued in counterpart Chinese Application No. 201380058933.X dated Mar. 20, 2017 with English translation (9 pages).

German-language Office Action issued in counterpart European Application No. 13 777 021.0 dated Mar. 15, 2017 with partial English translation (6 pages).

* cited by examiner

FUEL CELL HAVING A FLOW DISTRIBUTOR

CROSS REFERENCE TO RELATED APPLICATIONS

This application is a continuation of PCT International Application No. PCT/EP2013/071303, filed Oct. 11, 2013, which claims priority under 35 U.S.C. § 119 from German Patent Application No. 10 2012 221 676.6, filed Nov. 27, 2012, the entire disclosures of which are herein expressly incorporated by reference.

BACKGROUND AND SUMMARY OF THE INVENTION

The invention relates to a fuel cell, in particular to a polymer electrolyte fuel cell (PEFC), proton exchange membrane fuel cell (PEMFC), comprising an anode-cathode stack having at least one active surface layer which is formed by a first channel structure with a first and at least one second channel for conducting a first fluid over the at least one active surface layer of the anode-cathode stack, and in which a first distributor structure for distributing the first fluid into the first and the at least one second channel of the channel structure is provided. Furthermore, the invention relates to a method for operating a fuel cell comprising an anode-cathode stack having an active surface layer formed by a first channel structure with at least two channels while conducting a first fluid over the active surface layer.

Fuel cells, in particular those of hybrid motor vehicles, are provided in a known manner with an anode-cathode stack (bipolar plate stack) with a multiplicity of anodes and cathodes, which in each case form a layer of the stack and are separated by way of a membrane arranged in between. So that proton transport can take place in the membrane, hydrogen (in the form of gas) and oxygen (in the form of air) and, optionally, a coolant (in the form of liquid water) have to be supplied as reaction fluids into the respective layer. For this purpose, it is provided that at least one channel structure for the respective layer is provided on the anode-cathode stack. The channel structure conducts the fluids over the active surface by way of a multiplicity of channels. Furthermore, a distributor structure by which the respective fluid is distributed in the channels is formed at the edge of the channel structure.

The invention provides a fuel cell comprising an anode-cathode stack having at least one active surface layer which is formed by a first channel structure with a first and at least one second channel for conducting a first fluid over the at least one active surface layer of the anode-cathode stack, and in which a first distributor structure for distributing the first fluid into the first and the at least one second channel of the first channel structure is provided. The first distributor structure is configured with a first surface region assigned to the first channel and with a second surface region assigned to the second channel. The two surface regions are configured with flow resistances of differing magnitude for the first fluid distributed in the first distributor structure.

The solution according to the invention improves the fluid dynamics of the fluids to be conducted over the active surface of a fuel cell on an anode-cathode stack thereof. The solution is based on the finding that the respective fluid flows in the channels of the surface layer basically in a substantially laminar manner. The continuity equation:

$$\frac{\partial \rho}{\partial t} + div(\rho \vec{v}) = 0$$

(with the mass density $\rho$ and the velocity vector $\vec{v}$) applies for such flows.

This equation states that the mass flow through a closed surface always has to be equal to the change in the mass in the interior of the surface. If a fluid is introduced into a channel without the mass of the fluid changing in the interior of the channel, the same quantity of fluid must leave at the end of the channel as flows into the channel. If the channel is constricted at one point, the same quantity of fluid still has to leave at the end. This means that the fluid has to flow more rapidly in the narrower channel region than in the wider region.

Conversely, if different quantities of fluid are conducted in a plurality of channels of identical size, this results in the fluids flowing at different velocities in the channels. In the case of the channel structure on which the invention is based, such flows of different velocities would result in a nonuniform supply of the associated active surfaces.

Instead, with the solution according to the invention, the current situation in the distributor structure upstream of the respective channel is configured in such a manner that the quantity of fluid distributed into the channels per unit of time is substantially identical in size.

The flow resistance is the physical variable which denotes the force which is opposed to a motion. A body which moves relative to a fluid (gaseous and/or liquid medium) thus experiences a flow resistance, and, conversely, a fluid experiences a flow resistance if said fluid is conveyed under pressure through a channel. The flow resistance acts as a force opposed to the relative velocity.

The flow exerts a locally different shear stress and pressure (normal stress) on the surface of a body around or through which the flow passes. The integration of pressure and shear stress over the entire surface leads to the resulting force which acts as flow resistance.

There will therefore be physical variables of pressure and shear stress which act on the surface of a body and can therefore contribute to the flow resistance. Accordingly, the flow resistance can be divided into pressure resistance and friction resistance. The pressure resistance or the friction resistance can predominate depending on the shape of the body around or through which the flow passes.

The pressure resistance follows from the pressure distribution (normal stress) around a body or in a body. The effective area of this resistance is the projected area in the direction of the approach flow.

The friction resistance (surface resistance) is the result of friction, i.e. of the viscous pulse exchange. The friction resistance is based on the shear stresses which occur on the surface of the body by the flow rushing over the surface.

With the solution according to the invention, a surface region with a flow resistance of differing magnitude is in each case provided in the distributor structure in the inflow to at least two channels of the channel structure. Said flow resistances of differing magnitude make it possible for the fluid which is to be supplied to be able to flow at differing velocities and therefore over different distances per unit of time in the two surface regions. It can thereby be ensured that inflow or distributor lines of differing length can be provided for the at least two channels and nevertheless the same flow velocities are subsequently present in the two channels.

The invention particularly makes use in this consideration of the fact that the friction effects in respect of the motion of a fluid in the event of low viscosity can be disregarded and, in a good approximation, the Euler equation applies:

$$\frac{\partial \vec{v}}{\partial t} + (\vec{v} \cdot \nabla)\vec{v} = -\frac{\nabla p}{\rho}$$

This equation combines the change in velocity of the fluid at a location with the pressure P prevailing in the surroundings. It is therefore the motion equation for the fluid in the event of a high Reynolds number.

According to the invention, the friction resistance over the first and the second surface region is therefore preferably substantially disregarded (for example, although said two regions may be very different in terms of extent), and then only the pressure resistance is used. For this purpose, the flow resistance of differing magnitude for the first fluid distributed in the first distributor structure is configured in a particularly simple manner, by means of a flow layer thickness of different size, for the fluid flowing in the first surface region and the fluid flowing in the second surface region. Flow layer thickness here is understood as meaning the thickness of the layer in which the first fluid can flow over the respective surface region. In other words, it is the thickness of the then generally rectangular flow cross-sectional area over the respective surface region. Such a change in the flow cross-sectional area in the main direction of flow of the fluid can alternatively or additionally also be produced by way of embossed portions or internals in the surface regions. Such internals can have a wide variety of shapes, for example a conical shape, and in particular can also take on the function of spacers. Furthermore, the change in the flow cross-sectional area can advantageously be configured so as to change abruptly and/or continuously, for example as a sloping plane, in the main direction of flow.

Preferably, furthermore, according to the above explanation, a first inflow line for supplying fluid to the first distributor structure is connected to the first distributor structure, the first channel is arranged in a region of the active surface layer that is further away from the first inflow line than the second channel, and the flow resistance of the first surface region is configured to be lower than the flow resistance of the second surface region. The lower flow resistance is therefore assigned to that surface region which requires a greater flow path for the fluid flowing over it. This is produced overall by the fact that the quantities of fluid flowing over the two surface regions per unit of time can (if desired) be kept very substantially equal in size, and therefore flow quantities and also flow velocities which are likewise equal in size arise overall in the following channels.

For as uniform an introduction of fluid as possible into a comparatively wide ranging distributor structure, the first inflow line is preferably arranged centrally on one side of the first distributor structure, the second channel is arranged in an associated central region of the active surface layer and the first channel is arranged in this regard in an edge region of the active surface layer. The fluid can then advantageously be distributed further from the first inflow line in a manner fanned apart on the two sides thereof. In this manner, the required flow paths still have comparatively little difference in length within the distributor structure.

In order to produce the greater flow resistance in the second surface region, a reduction, which is V-shaped in top view, in the flow layer thickness is preferably provided there for the fluid flowing in the second surface region. The V shape produces a region of smaller flow layer thickness, which region expands towards two sides or fans out, and therefore, starting from an inflow side (at the point of the V shape), a flow approaches a plurality of channels (on the broadside of the V shape) with said reduced flow layer thickness.

The first channel structure with at least two channels for conducting a first fluid over the active surface layer is preferably delimited in relation to a second channel structure with at least two further channels for conducting a second fluid over the active surface layer by way of a first bipolar plate, and the reduction, which is V-shaped in top view, in the flow layer thickness is then preferably produced in the second surface region by way of a protuberance of said first bipolar plate. The bipolar plate is preferably a foil, preferably with a thickness of approx. 0.05 to 0.15 mm, and as such delimits the flow path of a plurality of fluids, in particular of hydrogen fed in and oxygen fed in, from each other. The protuberance formed, according to the invention, in the foil then leads to a smaller flow layer thickness in the one flow path while, in a corresponding manner in the other flow path, the flow layer thickness in the associated surface region can be increased. This increase can advantageously be used for the approach of the flow to channels in the second flow path, or the increase is at least not detrimental since the channels there are correspondingly configured in such a manner that the approach flow region which is then thicker does not have a negative effect on the approach of the flow to the channels.

The second channel structure with at least two further channels for conducting a second fluid over the active surface layer is advantageously delimited in relation to a third channel structure with at least two further channels again for conducting a third fluid over the active surface layer by way of a second bipolar plate. With such a second bipolar plate, it is possible to supply a total of three fluids separately to the individual surface layer.

A protuberance which is V-shaped in top view is then preferably likewise provided in the second bipolar plate. Such a protuberance affords the same advantages in associated surface regions for the further fluid supplied there as has been explained above for the first fluid. With a corresponding adaptation of the two V-shaped protuberances, it is also possible to provide a flow layer thickness which has an overall constant thickness between the protuberances. For this purpose, in the top view, the protuberance in the second bipolar plate is particularly preferably formed within the protuberance in the first bipolar plate.

According to the invention, finally, in accordance with the apparatus explained above, a method for operating a fuel cell having an anode-cathode stack is furthermore provided. For this purpose, the fuel cell includes an active surface layer which is formed by a first channel structure with at least two channels for conducting a first fluid over the active surface layer. The method itself includes the following steps: distributing the first fluid into the first and the at least one second channel of the first channel structure through a distributor structure, wherein the first fluid is conveyed to the first channel by the distributor structure with a flow resistance of differing magnitude than to the second channel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
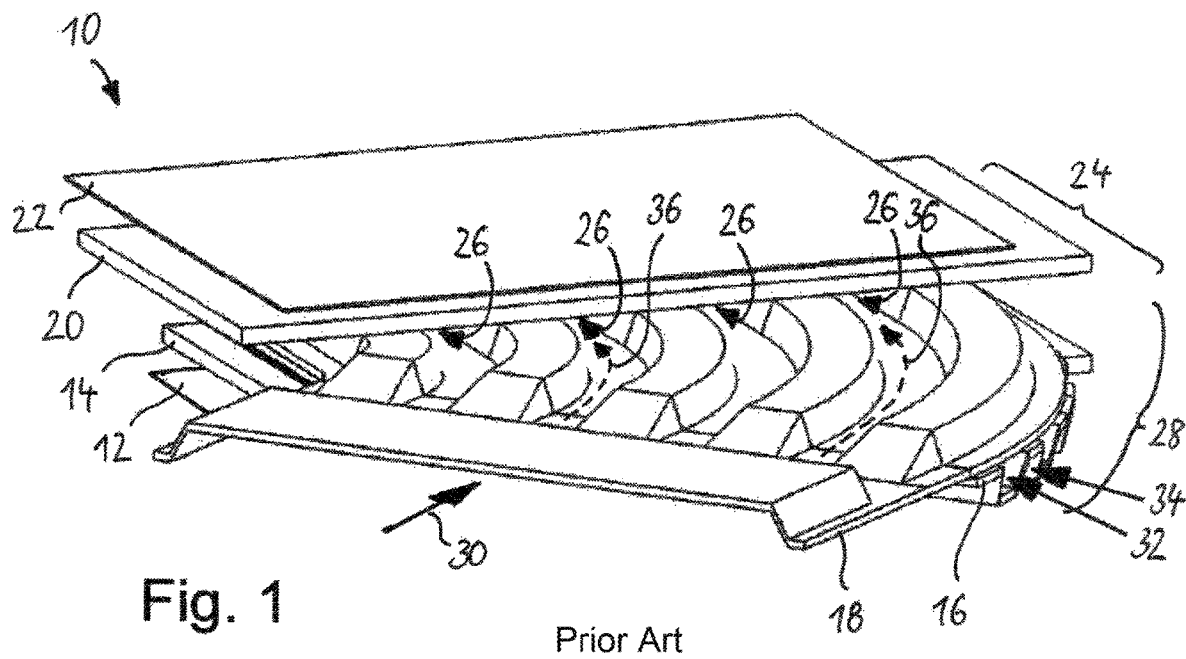
FIG. 1 is a perspective sectional view of a surface layer of an anode-cathode stack of a fuel cell according to the prior art.

FIG. 1 illustrates a surface layer 10 of an anode-cathode stack (not illustrated specifically) of a fuel cell for a motor vehicle, in particular a hybrid motor vehicle, according to the prior art. The surface layer 10 includes a lower membrane 12 as a "membrane electrode assembly", a lower gas diffusion layer 14, a lower bipolar plate 16, an upper bipolar plate 18, an upper gas diffusion layer 20 and an upper membrane 22 arranged in layers lying on one another. The membranes 12 and 22 and the gas diffusion layers 14 and 20 extend here over an active surface within which the bipolar plates 16 and 18 form channel structures 24 with a multiplicity of channels 26 in each case. Distributor structures 28, which are likewise formed with the bipolar plates 16 and 18, are mounted upstream of the channel structures 24. The distributor structures 28 serve to distribute a total of three fluids, namely air 30, liquid coolant 32 and gaseous hydrogen 34 (H2) into the channel structures 24 as uniformly as possible.

During this distribution of the fluids 30, 32 and 34, there is the problem that associated flow paths 36 of the fluids within the distributor structures 28 greatly differ in length. Finally, flow velocities of differing magnitude are therefore produced in the channels 26, which leads to a nonuniform action of the fluids on the associated active surfaces of the gas diffusion layers 14 and 20 and of the membranes 12 and 22.

Figure 2:
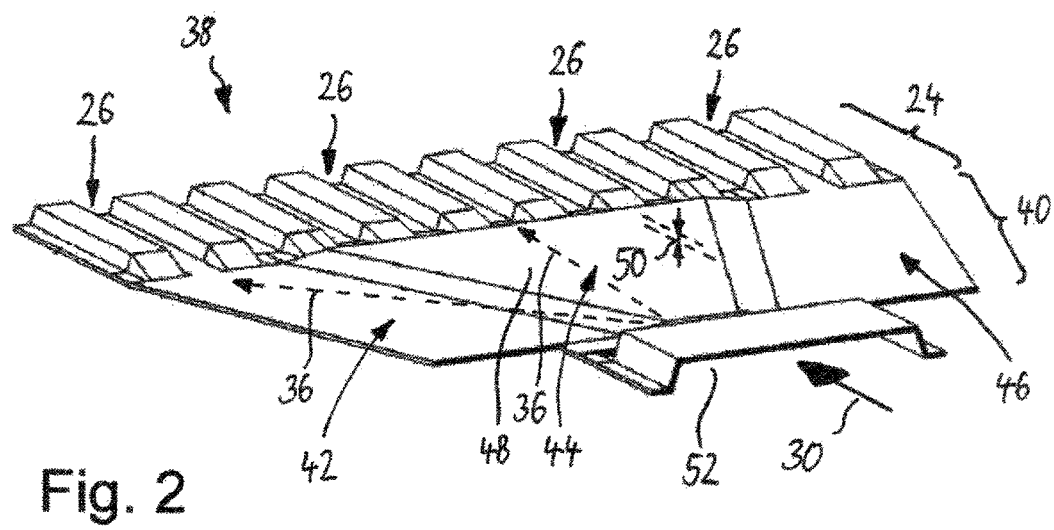
FIG. 2 is a perspective view of a bipolar plate of a first embodiment of a surface layer of an anode-cathode stack of a fuel cell according to the invention.
Figure 3:
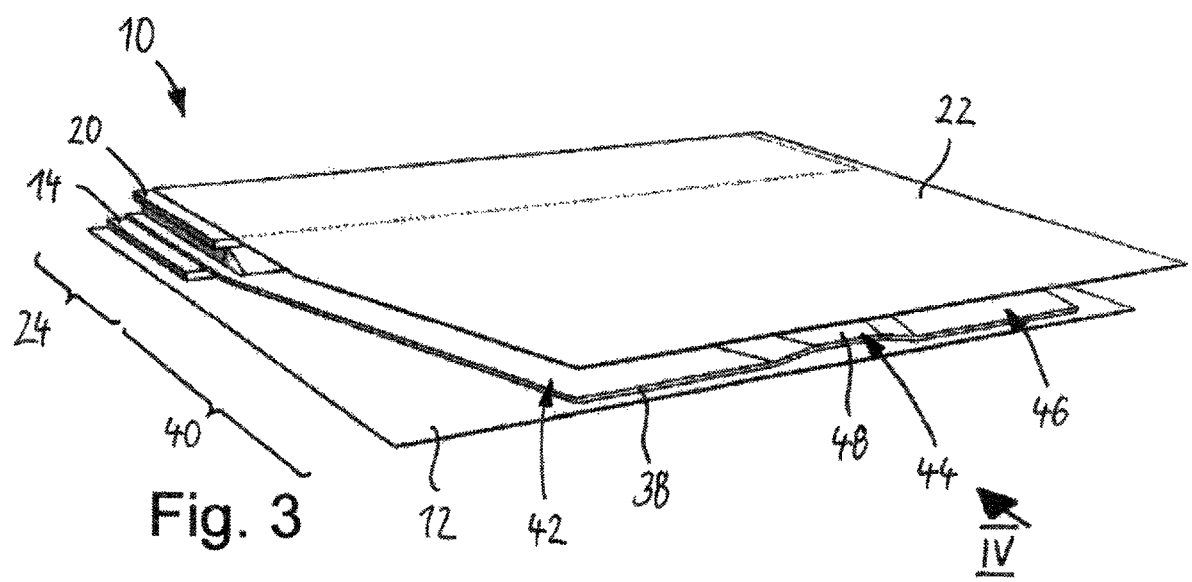
FIG. 3 is a perspective sectional view of a second embodiment of a surface layer of an anode-cathode stack of a fuel cell according to the invention.
Figure 4:
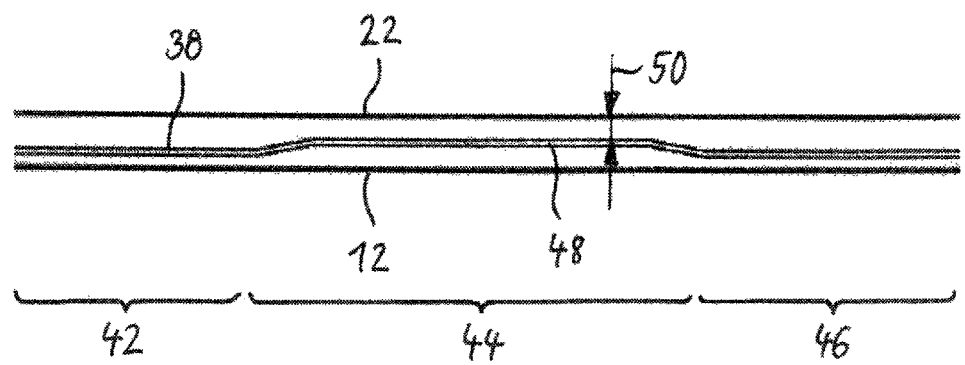
FIG. 4 is a view taken in the direction of arrow IV according to FIG. 3.

By contrast, in the case of the bipolar plate 38 illustrated in FIGS. 2 to 4, the associated distributor structure 40 is configured differently. This distributor structure 40 has a total of three surface regions 42, 44 and 46 which lie next to one another and of which the central surface region 44 is configured with a protuberance 48. The protuberance 48 is configured as an elevation which is V shaped in top view, is trapezoidal in side view and by means of which the surface region 44 is raised with respect to the adjacent surface regions 42 and 46. The raised portion at the same time brings about, on the upper side of the bipolar plate 38 and therefore under the upper membrane 22, a reduction in a flow layer thickness 50 there for the fluid-air 30 therefore flowing into the associated channel structure 24 and the channels 26 thereof. The air is supplied here by an inflow line 52 arranged centrally in front of the surface region 44.

With such a distributor structure 40, for a first channel 26, to which the surface region 42 is assigned, the flow path of the air 30 in the distributor structure 40 is likewise longer than in the surface region 44. At the same time, however, as explained above, with the reduced flow layer thickness 50 the flow resistance of the air 30 is also lower in the surface region 42 than in the surface region 44. Flow path and flow resistance are coordinated with each other here in such a manner that as far as possible the same amount of fluid enters the individual channel 26 of the channel structure 24 per unit of time.

On the lower side of such a bipolar plate 38 according to the invention hydrogen 34 can then be conducted, as illustrated in FIGS. 3 and 4, as the second fluid through the distributor structure 40. The hydrogen 34 is introduced laterally here at the sides of the distributor structure 40, i.e. on the surface region 42 and on the surface region 44. The upwardly directed protuberance 48 is then also advantageous for the inflow of the hydrogen 34 because then lower flow resistances arise for the further flow paths of the hydrogen 34 within the distributor structure 40 because of the larger flow cross sections.

Figure 5:
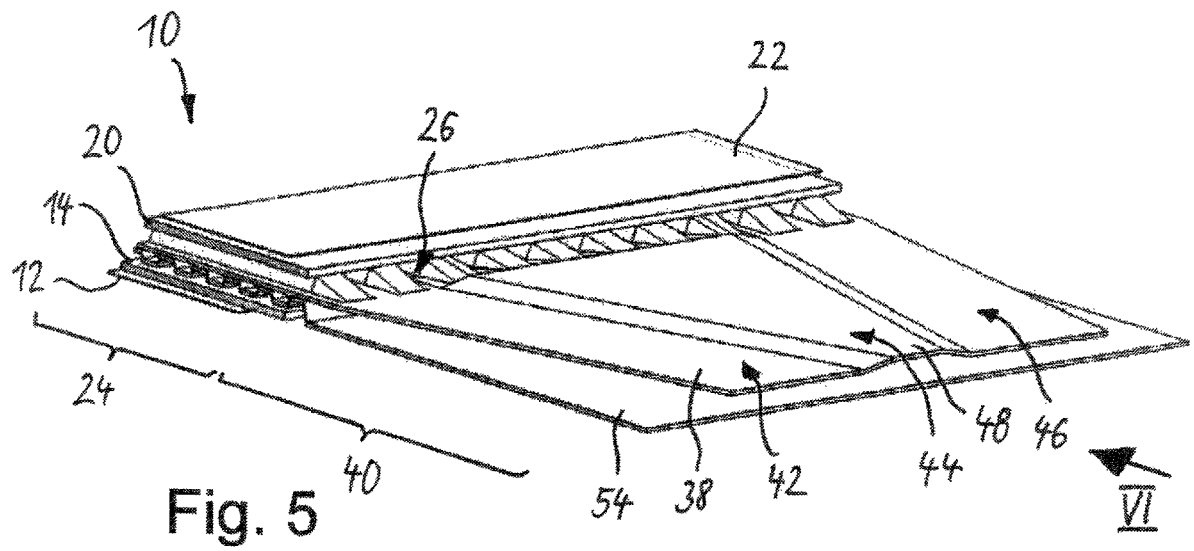
FIG. 5 is a perspective sectional view of a third embodiment of a surface layer of an anode-cathode stack of a fuel cell according to the invention.
Figure 6:
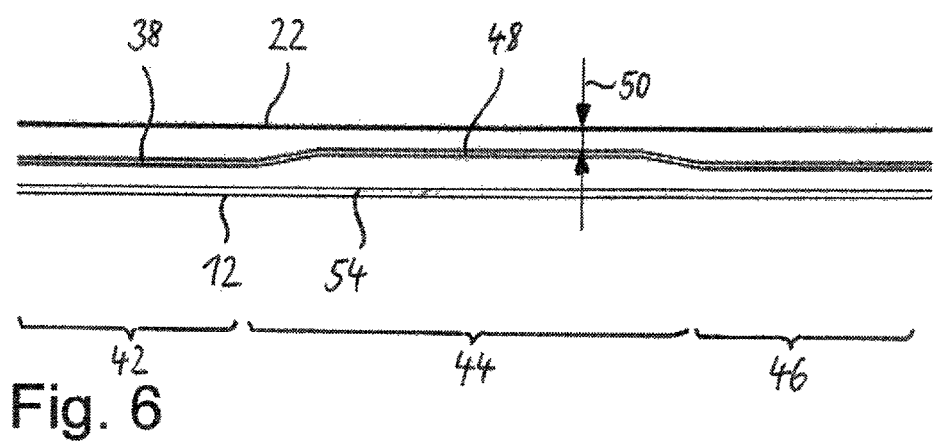
FIG. 6 is a view taken in the direction of arrow VI according to FIG. 5.

FIGS. 5 and 6 illustrate another embodiment in which, under such a bipolar plate 38, a second bipolar plate 54 likewise extends over and beyond the surface of the distributor structure 40. This second bipolar plate 54 delimits or seals off the distributor structure 40 downward in relation to the lower membrane 12. It is therefore possible to conduct in particular the coolant 32 over and beyond the distributor structure 40 to the associated channels 26 in the channel structures 24 in the fluid conducting layer arising between the bipolar plate 38 and the bipolar plate 54. In this embodiment, the hydrogen 34 is supplied to the other edges of the channel structure 24 by means of distributor structures (not illustrated specifically).

Figure 7:
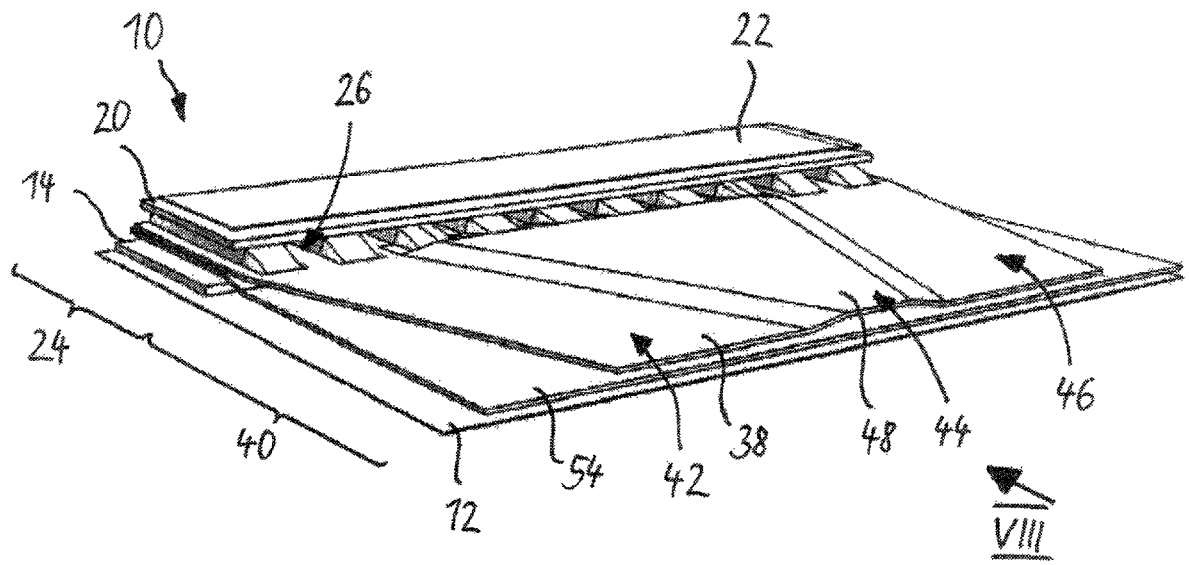
FIG. 7 is a perspective sectional view of a fourth embodiment of a surface layer of an anode-cathode stack of a fuel cell according to the invention.
Figure 8:
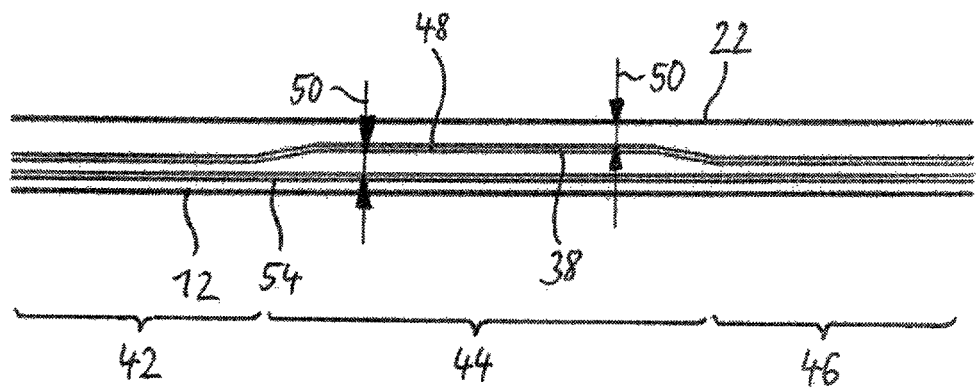
FIG. 8 is a view taken in the direction of arrow VIII according to FIG. 7.

FIGS. 7 and 8 show a variant in which a further fluid conducting layer through which hydrogen 34 can be conducted is located below the second bipolar plate 54. This fluid conducting layer extends in a corresponding manner between the second bipolar plate 54 and the lower membrane 12 and can serve to conduct the hydrogen 34 directly into the coordinate channel structure 24.

Figure 9:
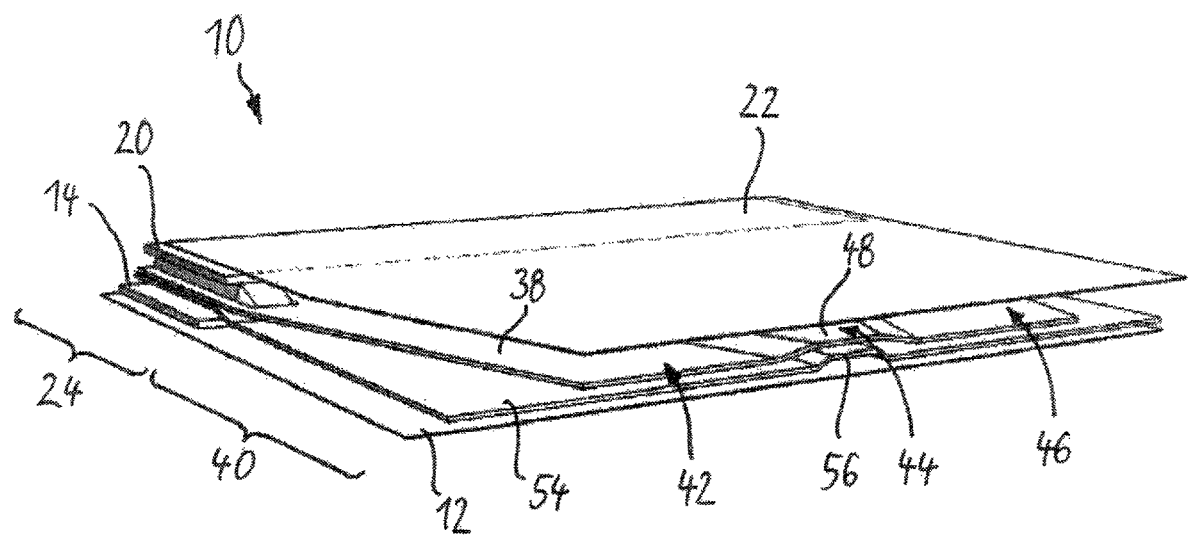
FIG. 9 is a perspective sectional view of a fifth embodiment of a surface layer of an anode-cathode stack of a fuel cell according to the invention.
Figure 10:
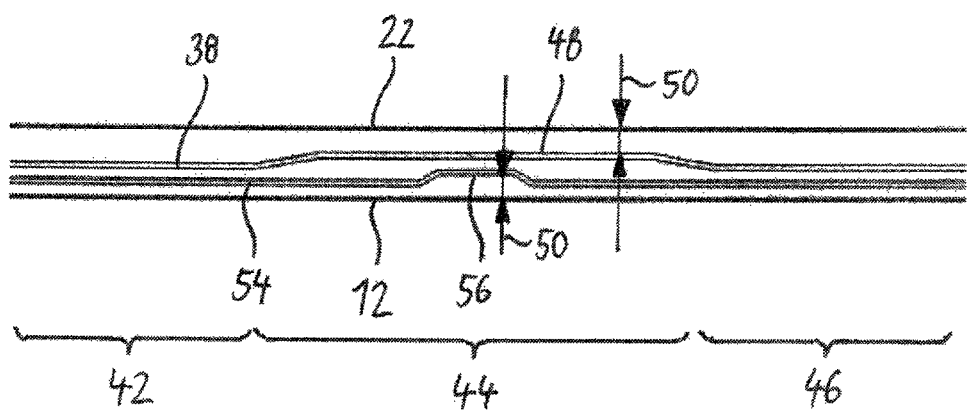
FIG. 10 is a view taken in the direction of arrow X according to FIG. 9.

In order further to improve the conducting in of hydrogen 34 in such a manner, it is then provided, according to the variant illustrated in FIGS. 9 and 10, that the second bipolar plate 54 also has a protuberance 56. The protuberance 56 is likewise directed upward in a manner corresponding to the protuberance 48 and likewise has a V shape in top view. In the top view, the protuberance 56 is therefore located under the protuberance 48 in a substantially congruent manner, but is somewhat smaller. A fluid conducting layer of substantially constant thickness over and beyond the surface regions 42, 44 and 46 and which is provided in particular for conducting in the coolant 32 is then produced between the bipolar plates 38 and 54 with the protuberances in this manner. At the same time, a reduced flow resistance for conducting to the central channels 26 of the associated channel structure 24 is produced under the bipolar plate 54 and the protuberance 48 thereof. As explained above, this also leads to a further improved, more uniform supply of hydrogen 34 into the associated surface layer 10 of the correspondingly configured fuel cell.

LIST OF REFERENCE NUMBERS

10 Surface layer of a fuel cell
12 Lower membrane
14 Lower gas diffusion layer
16 Lower bipolar plate according to the prior art
18 Lower bipolar plate according to the prior art
20 Upper gas diffusion layer
22 Upper membrane
24 Channel structure
26 Channel
28 Distributor structure according to the prior art
30 Air as first fluid
32 Coolant as further fluid
34 Hydrogen as further fluid
36 Flow path within the distributor structure
38 Bipolar plate according to the invention
40 Distributor structure according to the invention
42 Surface region
44 Surface region
46 Surface region
48 Protuberance
50 Flow layer thickness
52 Inflow line
54 Bipolar plate according to the invention
56 Protuberance The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell having an anode-cathode stack, comprising:
   at least one active surface layer formed by a first channel structure with a first and at least one second channel for conducting a first fluid over the active surface layer of the anode-cathode stack;
   a first distributor structure configured to distribute the first fluid into the first and the at least one second channel of the first channel structure, wherein
   the first distributor structure is configured with a first surface region upstream of an entrance of the first channel and a second surface region upstream of each entrance of each of the at least one second channel, and
   the first and second surface regions are configured to have a different flow resistance for the first fluid distributed in the first distributor structure.

2. The fuel cell according to claim 1, wherein the different flow resistance of the first surface region and the second surface region is achieved by providing different flow channel thicknesses of the first surface region and the second surface region.

3. The fuel cell according to claim 2, further comprising:
   a first inflow line connected to the first distributor structure in order to supply the first fluid to the first distributor structure, wherein
   the first channel is arranged in a region of the active surface layer further away from the first inflow line than the second channel, and
   the flow resistance of the first surface region is configured to be lower than the flow resistance of the second surface region.

4. The fuel cell according to claim 1, further comprising:
   a first inflow line connected to the first distributor structure in order to supply the first fluid to the first distributor structure, wherein
   the first channel is arranged in a region of the active surface layer further away from the first inflow line than the second channel, and
   the flow resistance of the first surface region is configured to be lower than the flow resistance of the second surface region.

5. The fuel cell according to claim 3, wherein
   the first inflow line is arranged centrally on one side of the first distributor structure,
   the second channel is arranged in an associated central region of the active surface layer, and
   the first channel is arranged in an edge region of the active surface layer.

6. The fuel cell according to claim 4, wherein
   the first inflow line is arranged centrally on one side of the first distributor structure,
   the second channel is arranged in an associated central region of the active surface layer, and
   the first channel is arranged in an edge region of the active surface layer.

7. The fuel cell according to claim 5, wherein the greater flow resistance in the second surface region is achieved by a reduction in the flow layer thickness in the second surface region for the first fluid flowing in the second surface region.

8. The fuel cell according to claim 7, wherein the second surface region has a substantially V-shape in a top view.

9. The fuel cell according to claim 8, further comprising:
   a first bipolar plate delimiting the first channel structure in relation to a second channel structure having at least two further channels for conducting a second fluid over the active surface layer; and
   wherein the reduction in the flow layer thickness in the second surface region, which is V-shape in top view, is obtained by a protuberance of the first bipolar plate.

10. The fuel cell according to claim 9, further comprising:
    a second bipolar plate delimiting the second channel structure in relation to a third channel structure having at least two further channels for conducting a third fluid over the active surface layer.

11. The fuel cell according to claim 10, wherein a protuberance, having a V-shape in top view, is provided in the second bipolar plate.

12. The fuel cell according to claim 11, wherein the protuberance in the second bipolar plate is formed so as to be within the protuberance in the first bipolar plate.

13. A method for operating a fuel cell having an anode-cathode stack, the fuel cell comprising an active surface layer formed by a first channel structure with at least two channels for conducting a first fluid over the active surface layer, the method comprising the act of:
    distributing the first fluid into a first and a second of the at least two channels of the first channel structure via a distributor structure upstream of entrances of the at least two channels,
    wherein the act distributing the first fluid via the distributor structure includes conveying a first portion of the first fluid within the distributor structure to the first channel at a flow resistance of a different magnitude than a flow resistance of a second portion of the first fluid conveyed within the distributor structure to the second channel.

* * * * *